US012759151B2

(12) United States Patent
Xu et al.

(10) Patent No.: US 12,759,151 B2
(45) Date of Patent: Oct. 13, 2026

(54) TRAINING DATA GENERATION DEVICE AND TRAINING DATA GENERATION PROGRAM

(71) Applicant: KAWASAKI JUKOGYO KABUSHIKI KAISHA, Kobe (JP)

(72) Inventors: Tianfen Xu, Kobe (JP); Seita Ono, Kobe (JP); Kippei Matsuda, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/725,365

(22) PCT Filed: Dec. 16, 2022

(86) PCT No.: PCT/JP2022/046451
§ 371 (c)(1),
(2) Date: Jun. 28, 2024

(87) PCT Pub. No.: WO2023/127555
PCT Pub. Date: Jul. 6, 2023

(65) Prior Publication Data

US 2025/0065505 A1 Feb. 27, 2025

(30) Foreign Application Priority Data

Dec. 28, 2021 (JP) ................................ 2021-214982

(51) Int. Cl.
*B25J 9/16* (2006.01)
*G06F 3/14* (2006.01)
(Continued)

(52) U.S. Cl.
CPC .............. *B25J 9/1669* (2013.01); *G06F 3/14* (2013.01); *G06V 10/774* (2022.01); *G06V 20/70* (2022.01)

(58) Field of Classification Search
CPC ......... B25J 13/08; B25J 9/1669; G06V 20/70; G06V 10/774; G06V 10/945; G06V 10/7788; G06V 2201/06; G06F 3/14
See application file for complete search history.

(56) References Cited

U.S. PATENT DOCUMENTS

2018/0260628 A1* 9/2018 Namiki ............... G06F 18/2413
2020/0122321 A1* 4/2020 Khansari Zadeh .... B25J 9/1697
(Continued)

FOREIGN PATENT DOCUMENTS

JP 2012-174222 A 9/2012
JP 2020-197978 A 12/2020
(Continued)

OTHER PUBLICATIONS

Boularias; "Learning Robot Grasping from 3-D Images with Markov Random Fields"; 2011 IEEE/RSJ International Conference on Intelligent Robots and Systems; 2011; 1548-1553 (Year: 2011).*

*Primary Examiner* — Stephen Holwerda
(74) *Attorney, Agent, or Firm* — Oliff PLC

(57) ABSTRACT

A controller includes: a label assigner that assigns a label indicating predetermined information to an image object in response to input operation of a user; a generator that generates a group of an image and a label assigned to the image as training data; and a storage that stores a second image on which detection by a detection model was performed and failed for an object, in association with a detection result by a detection model. In the second image, the label assigner assigns the label indicating the predetermined information to a detection failed object in response to input operation of the user and substitutes the label indicating the predetermined information of a detection successful object by the detection result. The generator generates a group of the second image, and the label assigned to the
(Continued)

detection failed object and the detection result of the detection successful object as training data.

11 Claims, 11 Drawing Sheets

(51) Int. Cl.
*G06V 10/774* (2022.01)
*G06V 20/70* (2022.01)

(56) References Cited

U.S. PATENT DOCUMENTS

| | | | | |
|---|---|---|---|---|
| 2020/0311854 | A1* | 10/2020 | Toda | B25J 9/1671 |
| 2020/0319627 | A1* | 10/2020 | Edwards | G05B 19/41885 |
| 2020/0342267 | A1 | 10/2020 | Usuda | |

FOREIGN PATENT DOCUMENTS

| | | | |
|---|---|---|---|
| JP | 2021-010970 | A | 2/2021 |
| WO | 2019/150813 | A1 | 8/2019 |

* cited by examiner

TRAINING DATA GENERATION DEVICE AND TRAINING DATA GENERATION PROGRAM

FIELD

The technique disclosed here relates to a training data generator and a training data generation program.

BACKGROUND

A device known to date generates training data for use in machine learning. In the device disclosed in Patent Document 1, for example, labelling, that is, annotation, is performed on a large number of images including objects to be detected. Then, training data in which images are associated with labels is generated. This training data is used for supervised machine leaning, thereby generating a leaning model.

CITATION LIST

Patent Document

Patent Document 1: Japanese Patent Application Publication No. 2020-197978

SUMMARY

In performing object detection on an image by using the generated leaning model, if one or more objects remain undetected, it is necessary to retrain and update the leaning model. Thus, a label needs to be assigned to an image including an undetected object to generate new training data. However, in the case of updating a leaning model after operation of a device incorporating a leaning model, the operation needs to be stopped. Thus, the time necessary for generating new training data is preferably as short as possible.

It is therefore an object of the technique disclosed here to shorten the time necessary for generating training data for retraining a trained detection model.

The technique disclosed here is a training data generator that generates training data for retraining a trained detection model that detects an object included in an image and predetermined information of the object. The training data generator includes: a label assigner that assigns a label indicating the predetermined information to the object included in the image in response to input operation of a user; a generator that generates a group of the image and the label assigned to the image as training data; and a storage that stores an image on which detection by the detection model was performed and failed for at least one object, in association with a detection result by the detection model. In the image in the storage, the label assigner assigns the label indicating the predetermined information to a detection failed object in response to input operation of the user and substitutes the label indicating the predetermined information of a detection successful object by the detection result. The generator generates a group of the image in the storage and the label assigned to the detection failed object and the detection result of the detection successful object as training data.

Another technique disclosed here is a training data generation program that causes a computer to perform the function of generating training data for retraining a trained detection model that detects an object included in an image and predetermined information of the object. The training data generation program causes the computer to perform the functions of: assigning a label indicating the predetermined information to the object included in the image in response to input operation of a user; generating a group of the image and the label assigned to the image as training data; storing an image on which detection by the detection model was performed and failed for at least one object, in association with a detection result by the detection model; assigning the label indicating the predetermined information to a detection failed object in response to input operation of the user and substituting the label indicating the predetermined information of a detection successful object by the detection result, in the image stored in the storage; and generating a group of the image in the storage, and the label assigned to the detection failed object and the detection result of the detection successful object, as training data.

The training data generator can shorten the time necessary for generating training data for retraining the trained detection model.

The training data generation program can shorten the time necessary for generating training data for retraining the trained detection model.

DESCRIPTION OF EMBODIMENTS

An exemplary embodiment will be specifically described hereinafter with reference to the drawings.

Figure 1:
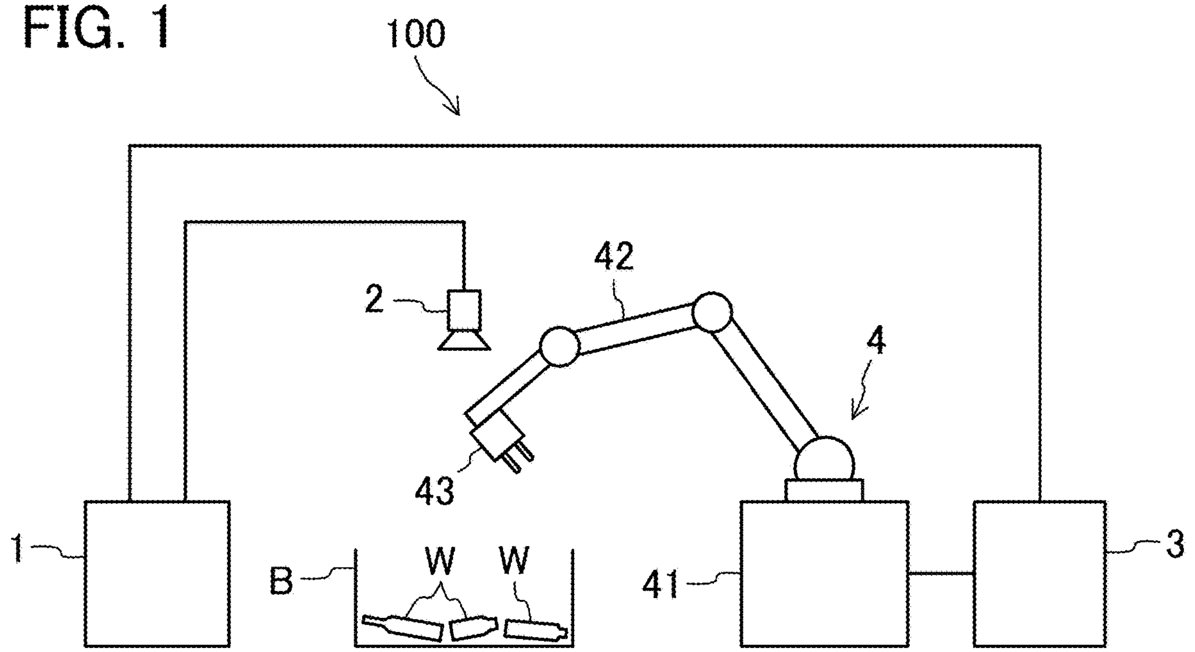
FIG. 1 illustrates a schematic configuration of a robot system.
Figure 2:
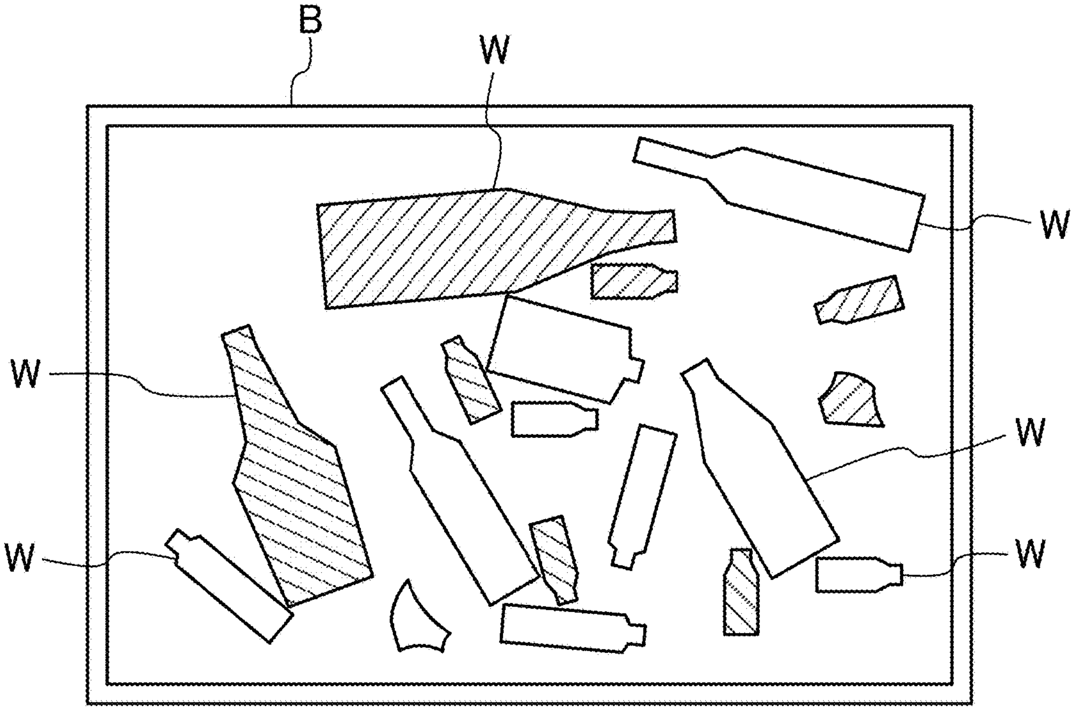
FIG. 2 is a plan view illustrating a bucket in which objects are irregularly placed.

FIG. 1 illustrates a schematic configuration of a robot system 100. FIG. 2 is a plan view illustrating a bucket B in which objects W are irregularly placed.

The robot system 100 includes a controller 1, an imager 2, a robot controller 3, and a robot 4. The controller 1 is an example of a training data generator. In the robot system 100, an image of the objects W irregularly placed in the bucket B is captured by the imager 2, and the controller 1 detects the objects W from the image captured by the imager 2, for example. The robot controller 3 causes the robot 4 to hold the objects W in the bucket B detected by the controller 1 and conveys the objects W to a predetermined place. In this example, the objects W are glass bottles.

The robot 4 includes a base 41 and a robot arm 42 rotatably coupled to the base 41. The robot arm 42 is, for example, a vertical articulated arm that holds the objects W. Specifically, the robot arm 42 is equipped with a hand 43 for holding the objects W.

The robot controller 3 controls the robot 4. The robot controller 3 controls various motions of the robot arm 42 including the hand 43. The controller 1 and the robot controller 3 are communicable with each other by wire or wirelessly. The robot controller 3 obtains positions of the objects W in the bucket B based on detection signals of the objects W output from the controller 1. The robot controller 3 controls the robot arm 42 and causes the robot arm 42 to hold the objects W based on the obtained positions of the objects W The imager 2 is located above the bucket B, for example. The imager 2 is communicable with the controller 1 by wires or wirelessly. The imager 2 takes an image of the bucket B, that is, objects W in the bucket B, and outputs the captured image to the controller 1. The imager 2 is, for example, a camera. The imager 2 may also be communicable with the robot controller 3 as well as the controller 1 by wires or wirelessly.

The controller 1 detects one or more objects W from the captured image output from the imager 2. More specifically, the controller 1 detects one or more objects W and predetermined information on the objects W from the captured image. The controller 1 outputs the detected predetermined information of the objects W to the robot controller 3. Based on the predetermined information of the objects W from the controller 1, the robot controller 3 causes the robot arm 42 to hold the objects W as targets in the bucket B. In this example, the predetermined information of the objects W is positional information of the objects W in the image and attribute information of the objects W.

The controller 1 detects the predetermined information of the objects W from the image captured by the imager 2, by using a detection model trained by machine learning. The controller 1 also has the function of generating training data for training a detection model. Specifically, the controller 1 assigns labels to a first image including the objects W, and generates training data for training a detection model to be trained. With the detection model thus trained by using the first image, the predetermined information of the objects W is detected in the image. In this case, if the detection by the detection model failed for one or more objects W, images at this time are accumulated as second images. Then, the controller 1 assigns labels to the accumulated second images and generates training data for retraining the trained detection model, that is, updating the trained detection model.

The labels are also referred to as correct answer data or tags. In this example, the labels indicate predetermined information of objects W. That is, the labels indicate positions of the objects W in the image and attributes of the objects W. In this example, attributes of the objects W are colors of the objects W.

The training data is data for training the detection model. The training data is also referred to as study data or leaning data. In this example, the training data is data including, as a group, a first image and a second image along with labels assigned to the first image and the second image. In other words, the training data is data in which the first image and the second image are associated with labels assigned to the first image and the second image.

In machine learning, leaning is performed by using multiple pieces of training data. In this example, a collection of training data pieces will be referred to as a training data set, and each data piece included in the training data set will be referred to as training data. That is, the term "training data" means a group of data pieces described above, and the term "training data set" means a collection of such groups.

A detection model is a leaning model using machine learning. In this example, the detection model receives an image including objects W as an input, and outputs predetermined information of the objects W. Machine learning itself can employ various known techniques, such as neural network, reinforcement leaning, or deep learning. Machine learning may be supervised leaning or semi-supervised learning.

Figure 3:
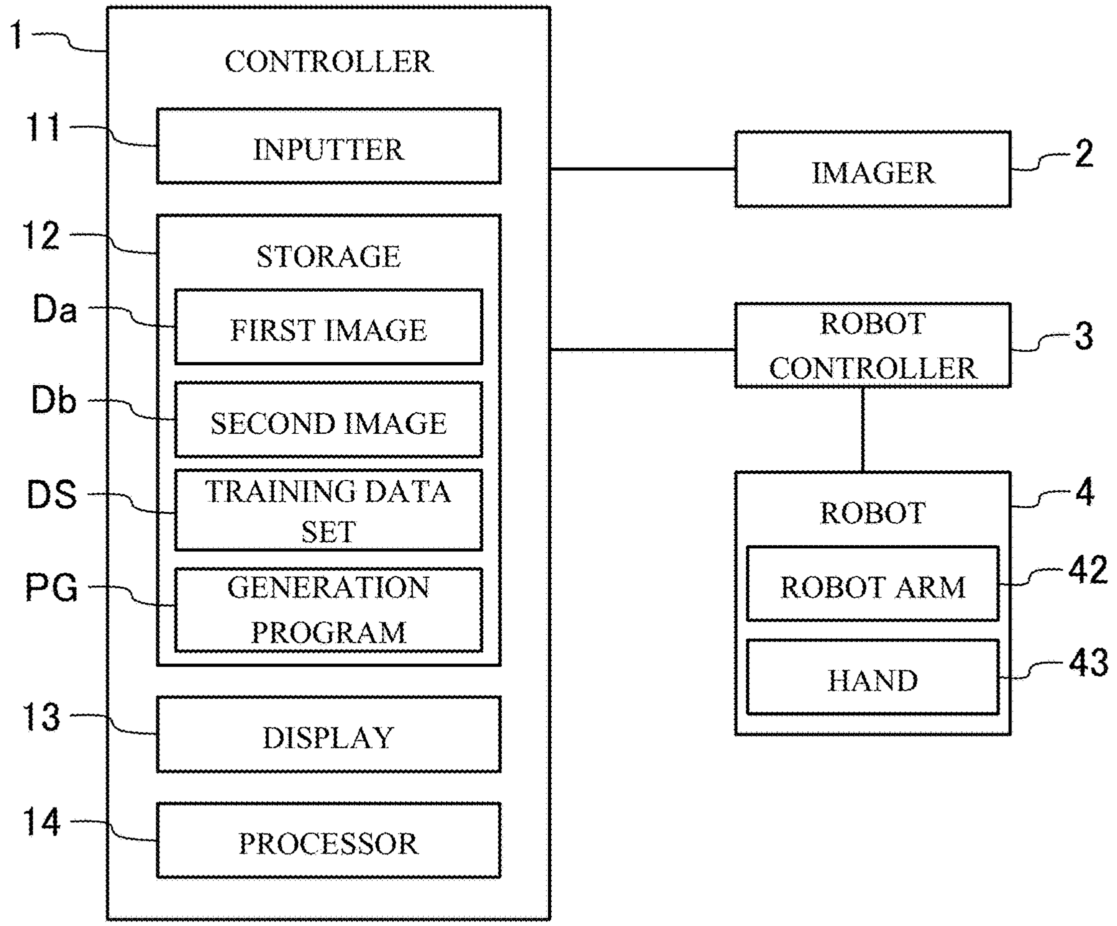
FIG. 3 is a block diagram illustrating a schematic configuration of a controller and peripheral equipment thereof.

FIG. 3 is a block diagram illustrating a schematic configuration of the controller 1 and peripheral equipment thereof. The controller 1 includes an inputter 11, a storage 12, a display 13, and a processor 14.

The inputter 11 receives input operation from a user. The inputter 11 outputs an input signal based on the input operation to the processor 14. The inputter 11 is, for example, a pointing device such as a touch panel or a mouse, or a keyboard.

The storage 12 is a computer-readable storage medium that stores programs and various types of data. The storage 12 is a magnetic disk such as a hard disk, an optical disk such as a CD-ROM or a DVD, or a semiconductor memory.

Specifically, the storage 12 stores a first image Da, a second image Db, a training data set DS, a generation program PG, and so forth.

The first image Da is an image including objects W. The first image Da is an image for training a detection model to be trained and is a captured image of objects W in the bucket B captured by the imager 2. The second image Db is an image on which detection by a trained detection model was performed and failed for at least an object W. The trained detection model is, for example, a detection model trained on training data generated by a generator 143 described later based on the first image Da. An image on which detection by the detection model is performed is a captured image of objects W in the bucket B captured by the imager 2, but is an image different from the first image Da. The training data set DS includes training data generated by the generator 143.

Here, a state where detection by the detection model failed for objects W means that the detection model failed to detect predetermined information of the objects W or inappropriately detected predetermined information of the objects W. Objects W for which detection by the detection model failed will be hereinafter referred to as "detection failed objects W." On the other hand, a state where detection of objects W by the detection model succeeded means that the detection model detected predetermined information of the objects W appropriately. Objects W for which detection by the detection model succeeded will be hereinafter referred to as "detection successful objects W."

The storage 12 stores the second image Db in association with a detection result by the detection model. The detection result by the detection model is predetermined information of objects W appropriately detected by the detection model, that is, predetermined information of detection successful objects W.

The generation program PG is an example of a training data generation program. The generation program PG is a program for causing a computer, that is, the processor 14, to perform functions for generating training data. The generation program PG is read out and executed by the processor 14.

The display 13 displays the first image Da and the second image Db. In this example, the display 13 displays a graphical user interface (GUI) screen, and displays the first image Da and the second image Db in the GUI screen. The display 13 is, for example, a liquid crystal display or an organic EL display.

Figure 4:
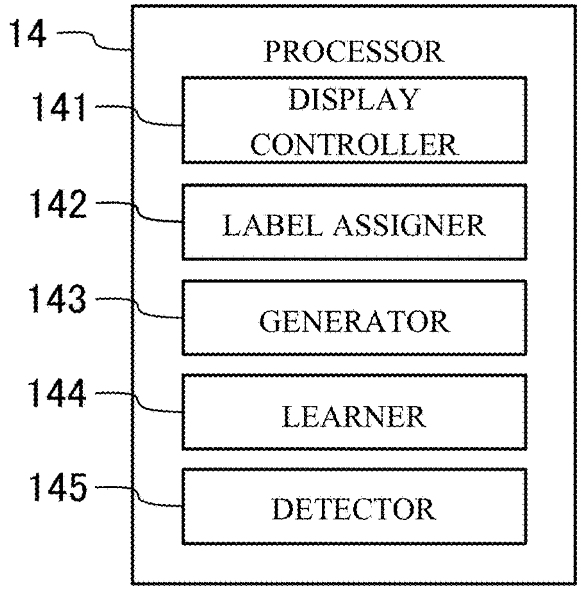
FIG. 4 is a functional block diagram of a processor of the controller.

FIG. 4 is a functional block diagram of the processor 14 of the controller 1. The processor 14 includes processors such as a central processing unit (CPU), a graphics processing unit (GPU), and/or a digital signal processor (DSP) and semiconductor memories such as a random access memory (RAM) and/or a read only memory (ROM). The processor 14 reads and executes the generation program PG and other programs from the storage 12.

Specifically, the processor 14 includes a display controller 141, a label assigner 142, a generator 143, a learner 144, and a detector 145, as functional blocks.

The display controller 141 acquires the first image Da and the second image Db. Specifically, the display controller 141 reads the first image Da from the storage 12 to thereby acquire the first image Da. The display controller 141 reads the second image Db from the storage 12 to thereby acquire the second image Db. The display controller 141 causes the display 13 to display the first image Da and the second image Db acquired from the storage 12.

In addition, the display controller 141 causes the display 13 to display, in an enlarged manner, an image selected by input operation of the user from first images Da and second images Db displayed by the display 13.

The label assigner 142 assigns labels indicating predetermined information of the objects W, that is, labels indicating positional information and attribute information of the objects W to objects W included in the first images Da in response to input operation of the user. That is, the label assigner 142 performs annotation of assigning labels to the first images Da.

The generator 143 generates a group of the first images Da and labels assigned to the first images Da as training data. That is, training data in which the first images Da are associated with the labels assigned to the first images Da is generated. The thus-generated training data is stored as a training data set DS in the storage 12.

The learner 144 generates a detection model. Specifically, the learner 144 reads the training data from the storage 12 and generates a trained detection model trained by machine learning with the training data. The trained detection model detects predetermined information of objects W included in an image. More specifically, when receiving an image including objects W, the detection model outputs predetermined information of the objects W, that is, the positions of the objects W and attributes (colors in this example) of the objects W. The trained detection model generated by the learner 144 is stored in the storage 12, for example.

The detector 145 detects objects W from the image by using the trained detection model, and further detects the positions and colors of the objects W. Specifically, the detector 145 inputs an image to the detection model read out from the storage 12 to thereby output the positions and colors of the objects W. That is, in the detector 145, a detection process by the detection model is performed.

The detector 145 stores an image on which detection was performed and failed for one or more objects W, that is, the second image Db, in the storage 12. That is, when the detector 145 performs a detection process, the detector 145 stores the second image Db in the storage 12. At this time, the detector 145 stores the second image Db in the storage 12 in association with a detection result by the detection model. The detector 145 may also store an image for which detection did not fail for any objects W in the storage 12, as well as the second image Db.

In the second image Db, the label assigner 142 assigns labels indicating predetermined information to detection failed objects W in response to input operation of the user, and substitutes labels indicating predetermined information of detection successful objects W by a detection result by the detection model. For detection successful objects W, positions and colors of the objects W are appropriately detected. Thus, a detection result of the detection successful objects is used as labels so that the process of assigning labels in response to input operation of the user can be omitted. That is, the process of assigning labels to the second image Db is performed not on all the objects W included in the second image Db but on only detection failed objects W. In this example, detection failed objects W are undetected objects W or misdetected objects W.

The generator 143 generates a group of the second image Db and labels assigned to detection failed objects W and a detection result of detection successful objects W, as training data. In this manner, the generator 144 generates training data for retraining the trained detection model.

More specifically, the label assigner 142 assigns, to objects W included in the first image Da and the second image Db displayed by the display 13, marks indicating predetermined information of the objects W in response to input operation of the user to thereby assign labels. For the second image Db, marks are assigned to detection failed objects W included in the second image Db in response to input operation of the user. Specifically, the label assigner 142 assigns marks to objects W in response to input operation of the user to thereby assign positions of the mark as positions of the objects W. The positions of the marks are set as positions at which the robot arm 42 performs a predetermined process on the objects W based on the positions of the marks. Specifically, the position of each mark is set as a position at which the robot arm 42 holds the object W. That is, in this example, the predetermined process performed on an object W by the robot arm 42 is the process of holding the object W. The label assigner 142 assigns a mark of a color distinguished based on attribute information of an object W to the object W to thereby assign attribute information of the object W. In this example, the label assigner 142 assigns a mark of a color distinguished based on the color of a bottle to the bottle to thereby assign color information of the bottle.

In addition, in causing the display 13 to display the second image Db, the display controller 141 assigns marks indicating a detection result by a detection model to detection successful objects W included in the second image Db. That is, the display controller 141 assigns marks similar to a label assigning process by the label assigner 142, that is, marks indicating predetermined information of detection successful objects W in the second image Db. Thus, the label assigning process can be substituted by a detection result by the detection model in association with the second image Db.

Next, a process in the controller 1 will be schematically described. In the controller 1, the generator 143 assigns labels to the first image Da and generates training data for training a detection model to be trained. This process of generating training data will be hereinafter referred to as a first generation process. Subsequently, the learner 144 generates a detection model trained by machine learning by using training data generated in the first generation process. Thereafter, the detector 145 performs a detection process by using a detection model on an image output from the imager 2, and stores the second image Db subjected to this detection process in the storage 12 in association with a detection result of the detection model. The generator 143 assigns labels to the second image Db and generates training data for retraining the trained detection model, that is, updating the trained detection model. This process of generating training data will be hereinafter referred to as a second generation process. The learner 144 updates the detection model by using the training data generated in the second generation process.

Figure 5:
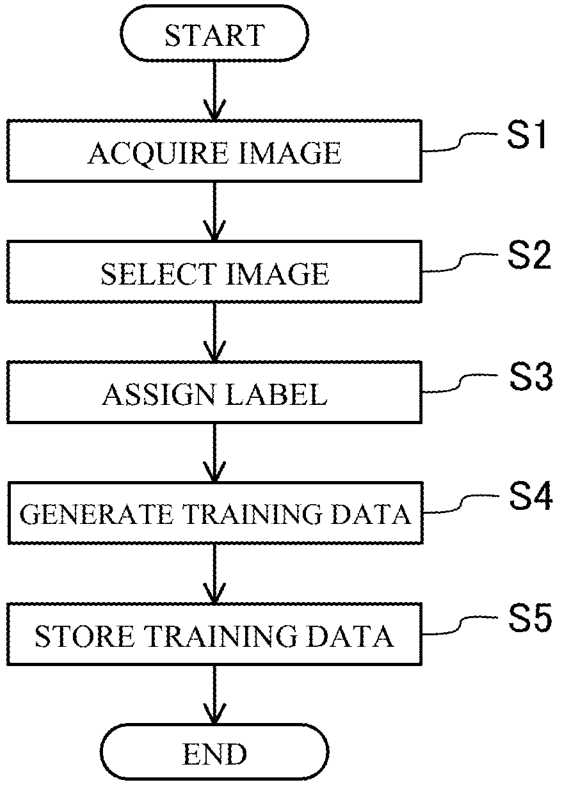
FIG. 5 is a flowchart depicting a generation process of the processor of the controller.

Then, the first generation process and the second generation process of training data described above will be described with reference to FIG. 5. FIG. 5 is a flowchart depicting a generation process of the training data generator. This flowchart is common to the first generation process and the second generation process.

Figure 6:
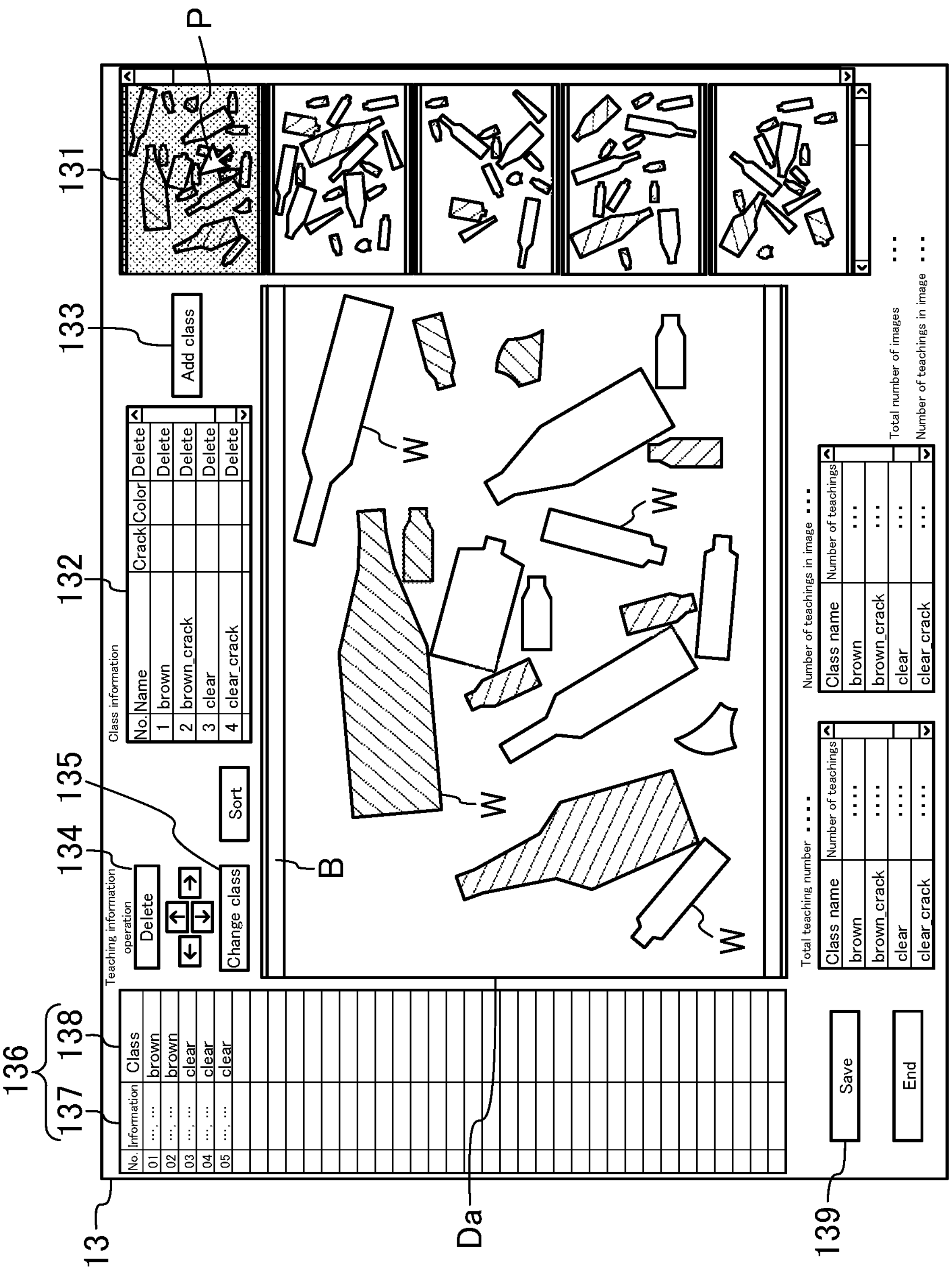
FIG. 6 illustrates an example of a state where a first image is selected in a display.

FIG. 6 illustrates an example of a state where the first image Da is selected in the display 13. First, in step S1, the first image Da is acquired. Specifically, the display controller 141 reads the first image Da from the storage 12. At this time, the number of first image Da to be read out can be set. As illustrated in FIG. 6, the first images Da acquired by the display controller 141 are displayed as a thumbnail list 131 in the display 13. In this generation process, the display controller 141 causes the display 13 to show a GUI screen.

Next, in step S2, a first image Da is selected from the thumbnail list 131. Specifically, the user selects a target first image Da to which labels are to be assigned from the thumbnail list 131. More specifically, the user selects the target first image Da with a pointer P of a mouse. In this example, a most significant first image Da in the image list is selected with the pointer P (see FIG. 6). The display controller 141 displays, in an enlarged manner, the first image Da selected by the user at the center of the display 13. In FIG. 6 and subsequent drawings, hatched bottles represent brown bottles or cracked pieces.

Figure 7:
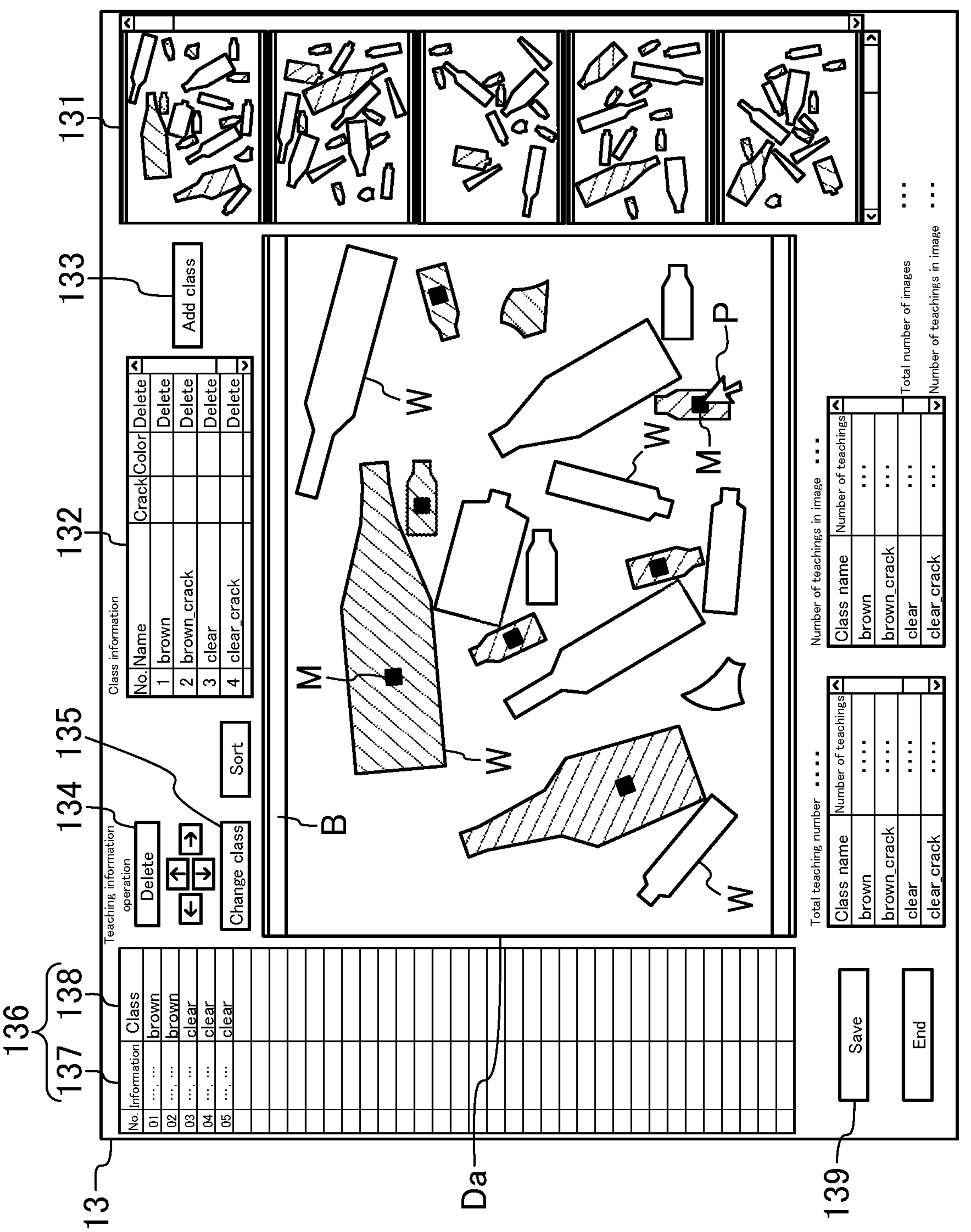
FIG. 7 illustrates an example of a state where marks are assigned to objects in the first image in the display.

FIG. 7 illustrates an example of a state where marks are assigned to objects W in the first image Da in the display 13. Then, in step S3, the label assigner 142 assigns labels to the enlarged first image Da. As illustrated in FIG. 7, the user performs input operation of specifying each object W (bottle) in the first image Da with the pointer P to thereby assign a label to the object W. More specifically, when the user specifies a predetermined position in the object W with the pointer P, the mark M is assigned to the specified position. The predetermined position is specified by visual observation of a position supposed to be easily held by the robot arm 42. Accordingly, a label indicating the position of the object W is assigned to the first image Da.

Marks M are color-coded based on the colors of the objects W. In this example, as indicated by a class specifier 132 in the display 13, marks M are color-coded depending on whether the mark M is a brown bottle or a transparent bottle. In addition, in this example, marks M are also color-coded depending on the states of objects W. That is, marks M are color-coded depending on whether the mark M is assigned to a cracked piece or not. The color of each mark M is specified such that the user specifies a color and a state (i.e., whether the target is a cracked piece or not) with the pointer P in the class specifier 132. In this manner, by specifying the color of the mark M assigned to the object W, a label indicating the color and state of the object W is assigned to the first image Da. In FIG. 7 and subsequent drawings, shapes of the marks M are changed depending on the colors and states of objects W.

Figure 8:
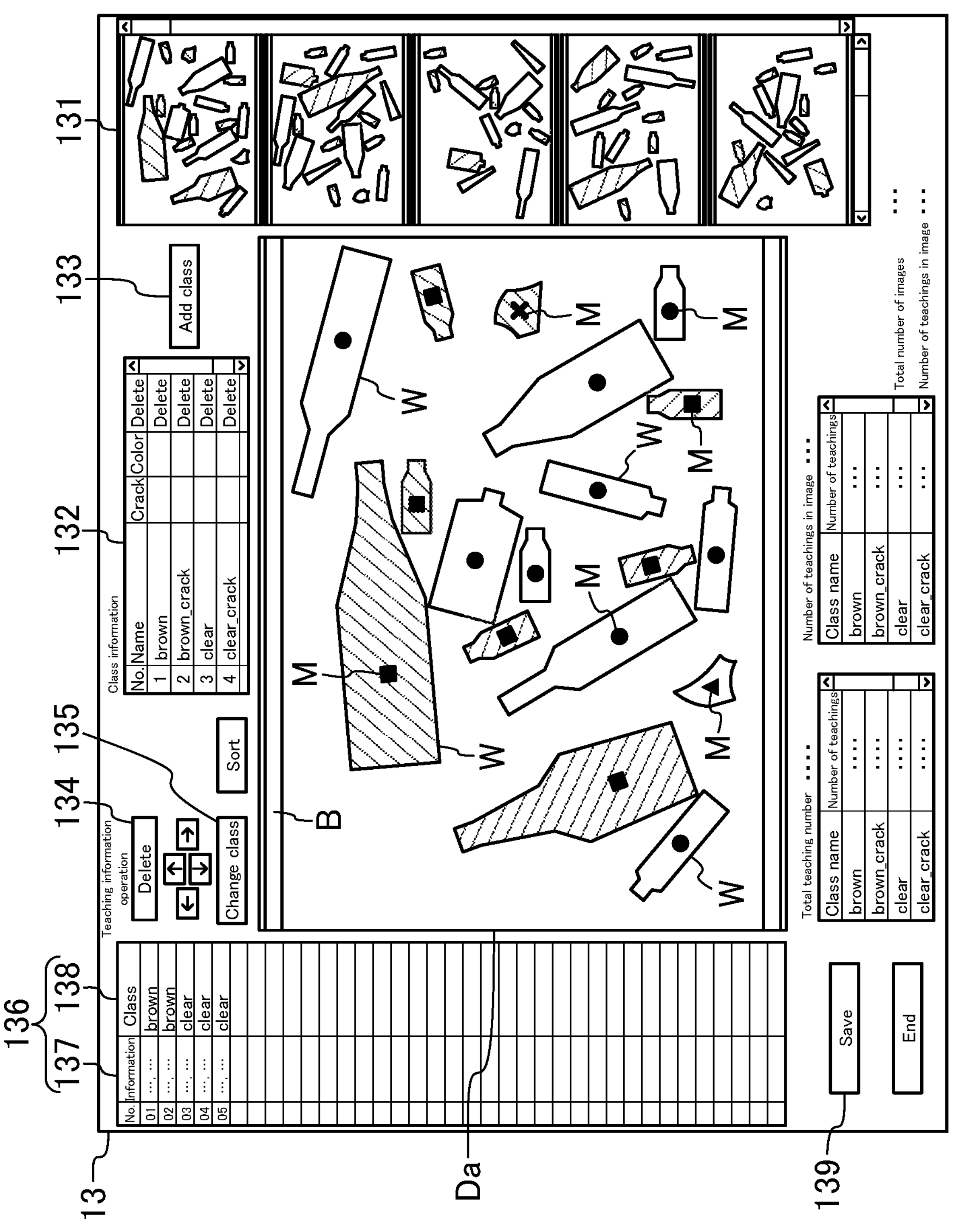
FIG. 8 illustrates an example of a state in which marks are assigned to all the objects in the first image in the display.

In the manner described, above, when a mark M is assigned to an object W, positional information and class information (i.e., color and state) of this object W are displayed as a label assignment list 136 at the left in the display 13. The label assignment list 136 shows positional information 137 and class information 138 of each object W to which a mark M is assigned. FIG. 8 illustrates an example of a state where marks are assigned to all the objects W in the first image Da in the display 13. As illustrated in FIG. 8, when the marks M are assigned to all the objects W in the first image Da, assignment of the labels to the first image Da is finished. That is, the user pushes a save button 139 in the display 13 with the pointer P. Accordingly, positional information and class information of all the objects W in the first image Da are determined.

In step S4, training data is generated. That is, the generator 143 generates a group of the first image Da and the labels assigned to the first image Da, as training data. For example, in a case where the first image Da includes multiple objects W, a group of one first image Da and multiple labels is generated as training data. In subsequent step S5, the generator 143 stores the generated training data in the storage 12. In this manner, the first generation process of training data is finished. The process from step S1 through step S5 is performed for each first image Da in the thumbnail list 131.

The learner 144 generates a trained detection model by using the thus-generated training data. Then, when the robot system 100 is operated, for example, the detector 145 sequentially performs detection processes on images captured by the imager 2, by using the trained detection model. In this process, second images Db are accumulated in the storage 12 in association with a detection result by the detection model.

Next, the second generation process will be described with reference to the flowchart of FIG. 5. FIGS. 9 through 15 illustrate examples of the second image Db in the display 13. FIGS. 9 through 15 show only the second image Db displayed on the GUI screen of the display 13.

First, in step S1, the display controller 141 acquires the second image Db. Specifically, the display controller 141 reads the second image Db from the storage 12. At this time, the number of second images Db to be read out can be set. In a manner similar to the first images Da, the acquired number of the second images Db are displayed as a thumbnail list 131 in the display 13. In this second generation process, the GUI screen is also displayed on the display 13, in a manner similar to the first generation process.

In next step S2, the second image Db is displayed in an enlarged manner. Specifically, the user selects the target second image Db from the thumbnail list 131. The display controller 141 causes the selected second image Db to be displayed at the center of the display 13 in an enlarged manner. At this time, the display controller 141 assigns marks indicating a detection result by the detection model associated with the selected second image Db to detection successful objects W in the second image Db.

Figure 9:
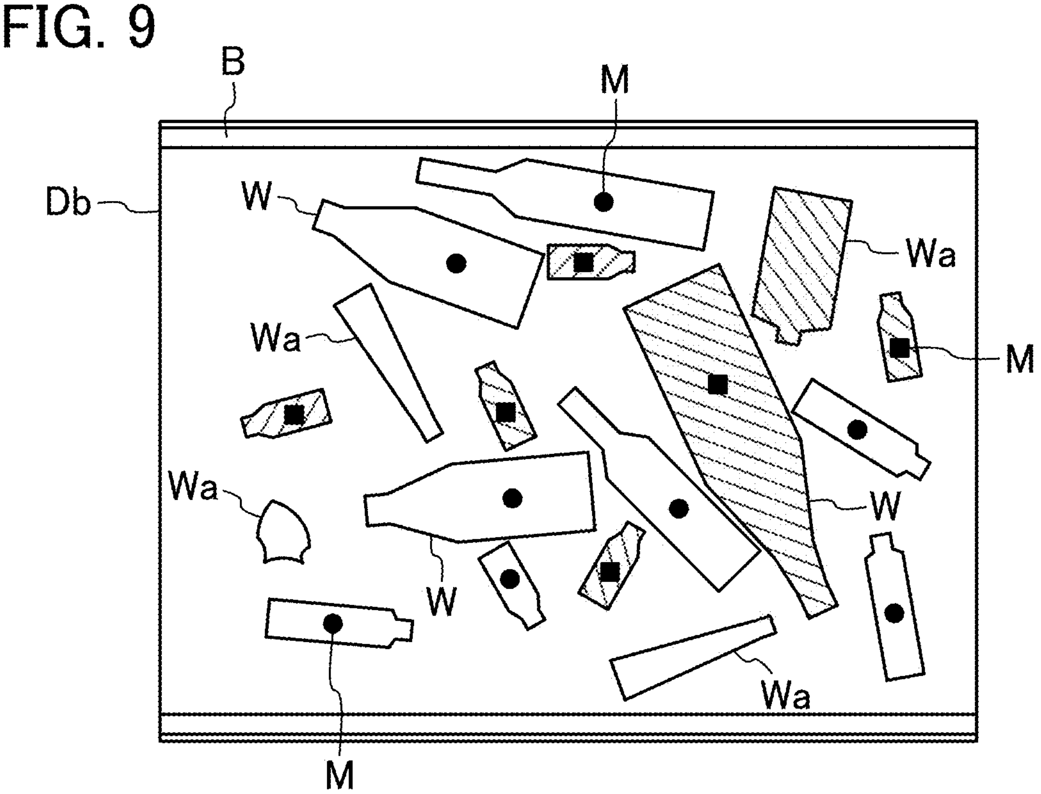
FIG. 9 illustrates an example of a second image in the display.

Subsequently, in step S3, labels can be assigned. For example, a case where the second image Db selected in step S2 is the image illustrated in FIG. 9 will be described. The second image Db in FIG. 9 is an image including undetected objects Wa (i.e., detection failed objects W) not detected in the detection process by the detector 145. It is assumed that the second image Db includes no misdetected objects. That is, marks M are assigned to detected objects W (i.e., detection successful objects W) by the display controller 141, and marks M are not assigned to undetected objects Wa.

Figure 10:
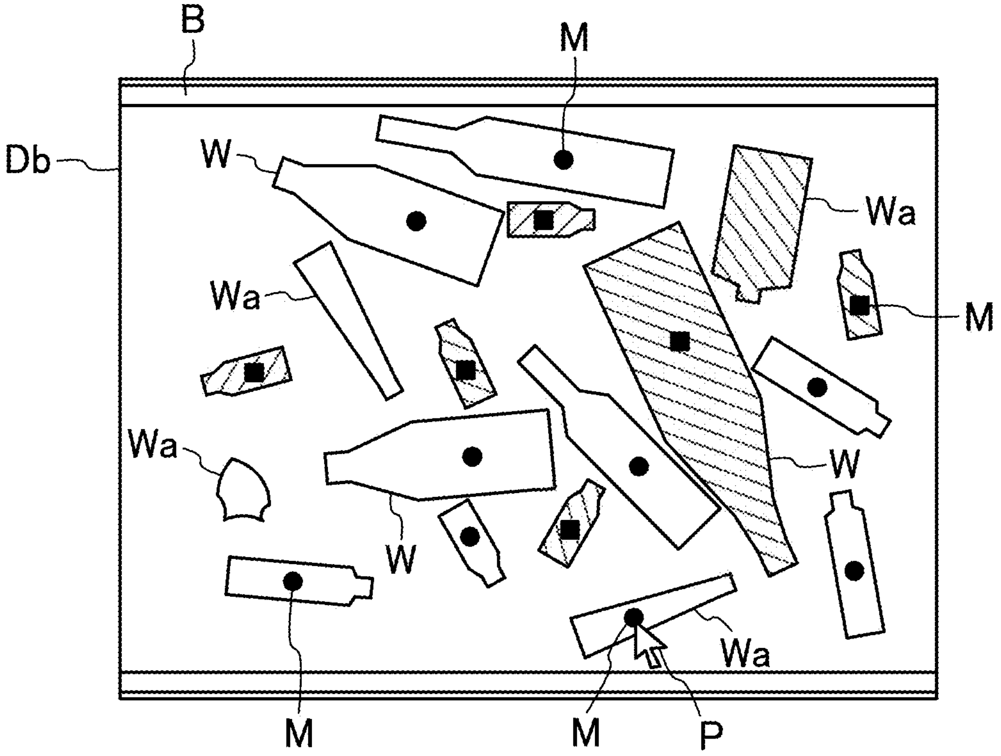
FIG. 10 illustrates an example of the second image in the display.
Figure 11:
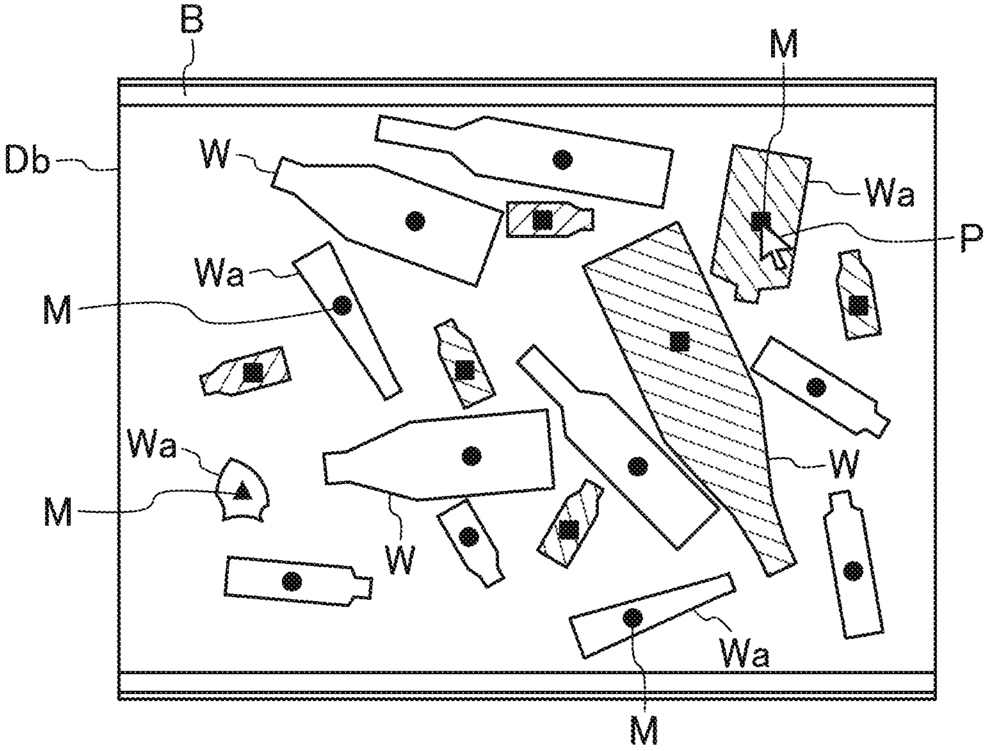
FIG. 11 illustrates an example of the second image in the display.

In the case of the second image Db in FIG. 9, the user assigns labels to only the undetected objects Wa by assigning marks M as illustrated in FIG. 10. At this time, in a manner similar to label assignment in the generation process described above, the mark M is assigned to a predetermined position in each object Wa, and the color of the mark M is specified depending on the color and state of the object Wa. In this manner, for the detected objects W, marks M (i.e., detection result) assigned to these objects W are utilized to omit a label assignment process is omitted. Accordingly, the time necessary for the label assignment process is shortened. In the manner described above, as illustrated in FIG. 11, when the label assignment process on all the undetected objects Wa is completed, step S3 is finished. In a case where attributes of the undetected objects Wa are new attributes, the user pushes a class add button 133 shown on the display 13 with the pointer P to thereby add new attribute information in the class specifier 132.

Figure 12:
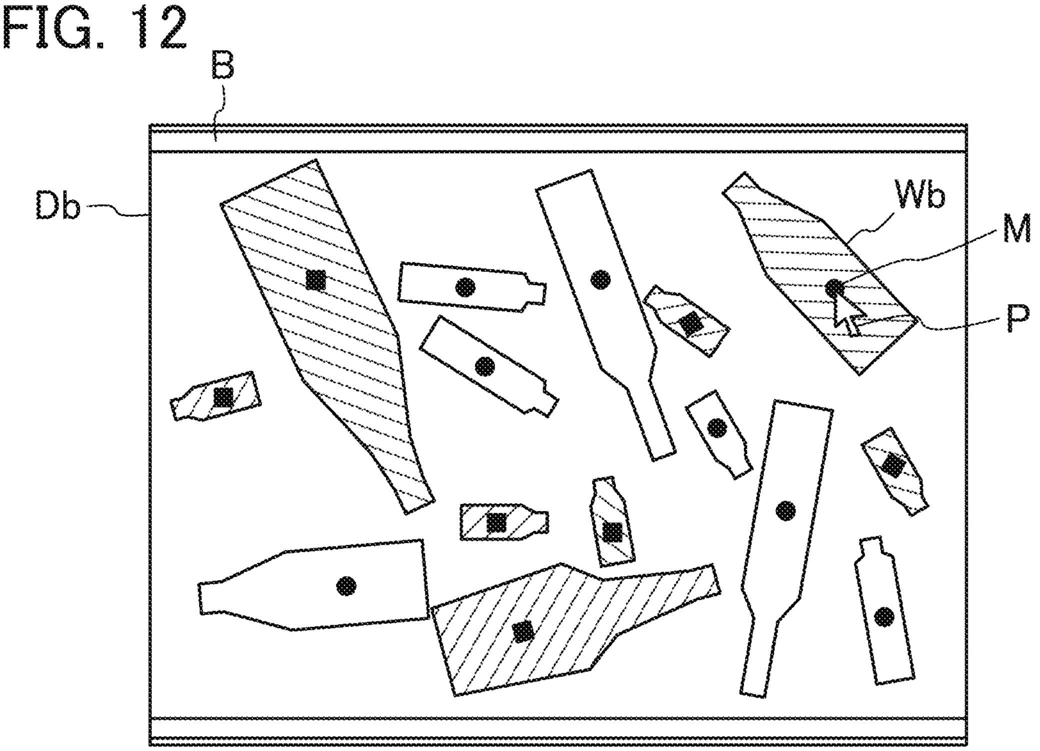
FIG. 12 illustrates an example of the second image in the display.
Figure 13:
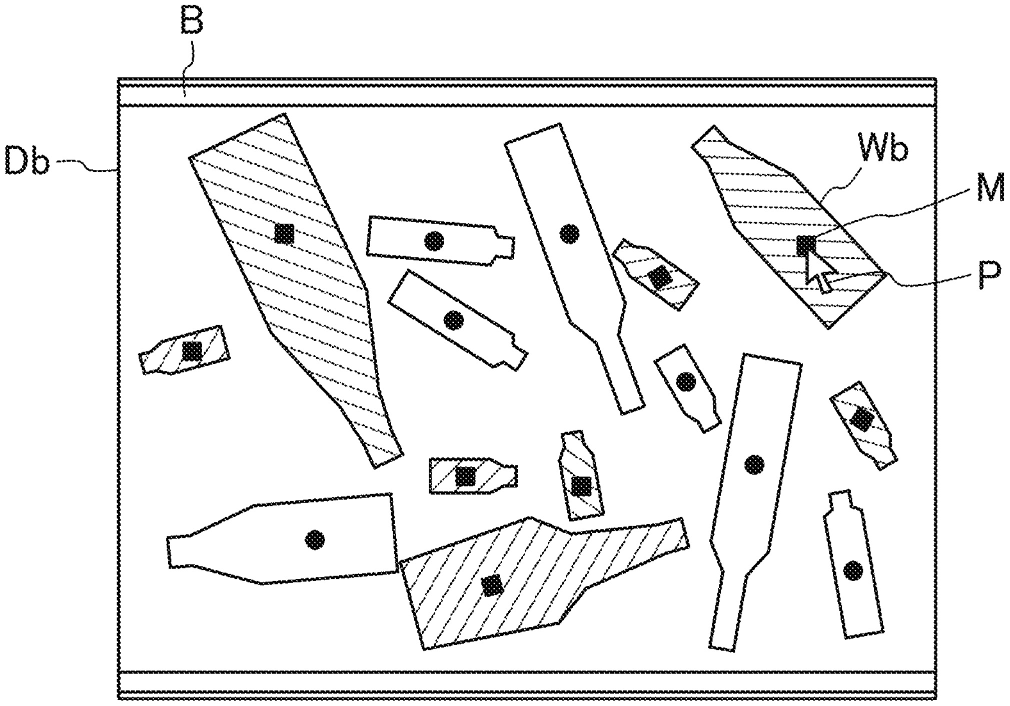
FIG. 13 illustrates an example of the second image in the display.

A case where the second image Db selected in step S2 is an image illustrated in FIG. 12 will be described. The second image Db in FIG. 12 is image including an object Wb misdetected in the detection process by the detector 145 (i.e., detection failed object W). It is assumed that the second image Db includes no undetected objects.

In this example, class information (specifically color information) of the object Wb is misdetected. In this case, the user specifies an erroneous mark M assigned to the misdetected object Wb with the pointer P and pushes a class change button 135 displayed on the display 13. After pushing the class change button 135, the user specifies a correct color in the class specifier 132 so that the color of the erroneous mark M is thereby changed (see FIG. 13). Then, step S3 is finished. In this case, for detected objects W (i.e., detection successful objects W), marks M (i.e., detection result) assigned to these objects W are utilized to omit a label assignment process is omitted.

Figure 14:
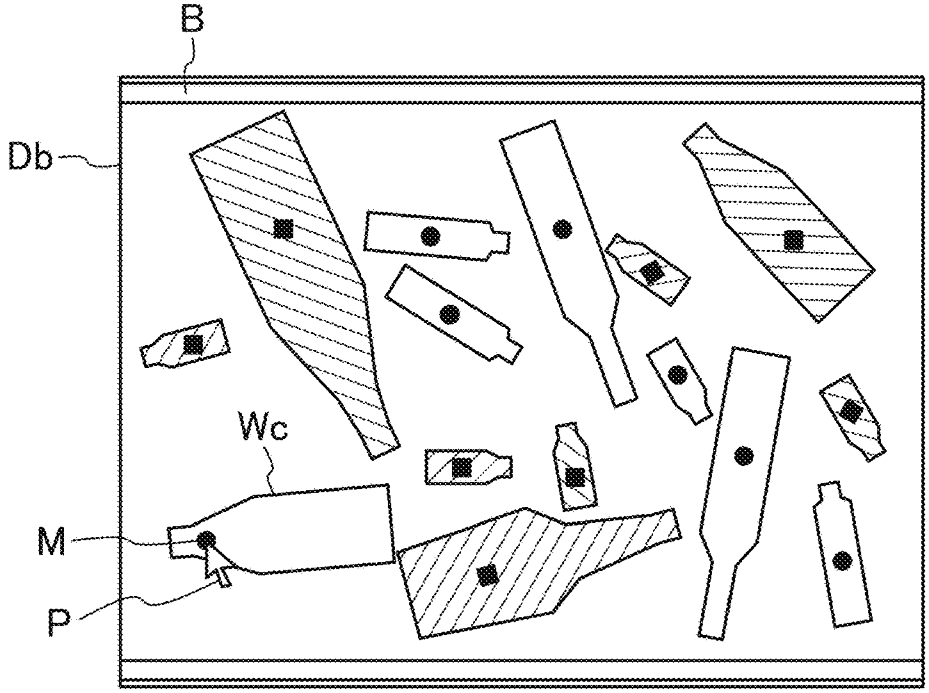
FIG. 14 illustrates an example of the second image in the display.
Figure 15:
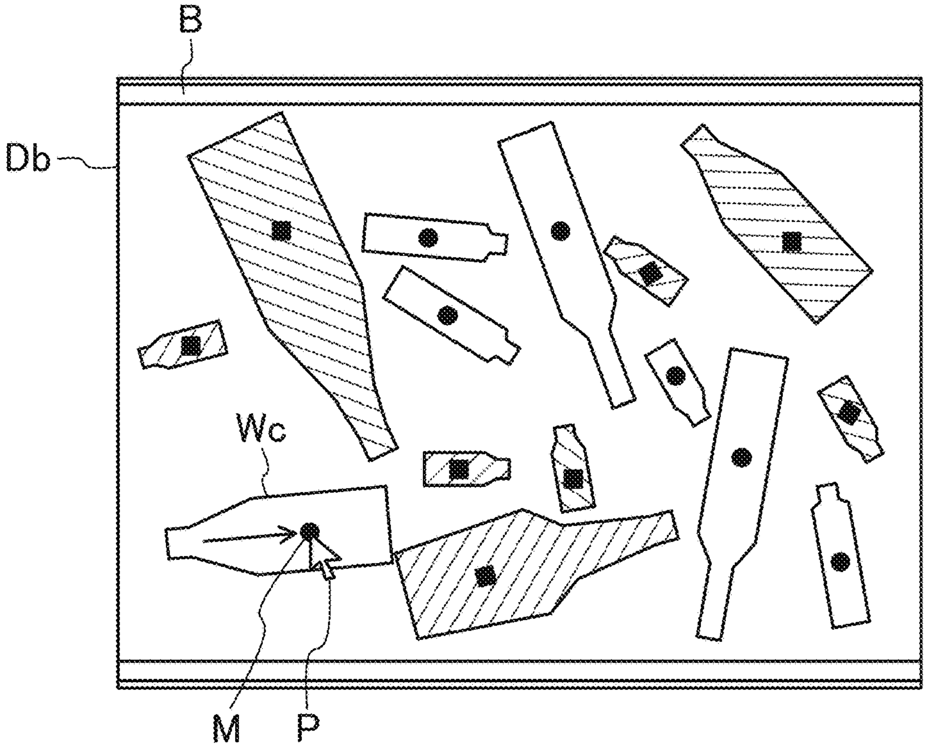
FIG. 15 illustrates an example of the second image in the display.

A case where the second image Db selected in step S2 is an image illustrated in FIG. 14 will be described. The second image Db in FIG. 14 is an image including an object Wc misdetected in the detection process by the detector 145 (i.e., detection failed object W). It is assumed that the second image Db includes no undetected objects.

In this example, positional information of the object Wc is misdetected. That is, the position of the mark M assigned to the object Wc is greatly displaced from a predetermined position. In this case, the user specifies the mark M assigned to the misdetected object Wc with the pointer P and moves the mark M to a predetermined position (see FIG. 15). Accordingly, the mark M assigned to the misdetected object Wc is changed to the correct position, and step S3 is finished. In this case, for detected objects W (i.e., detection successful objects W), marks M (i.e., detection result) assigned to these objects W are utilized to omit a label assignment process is omitted.

Figure 16:
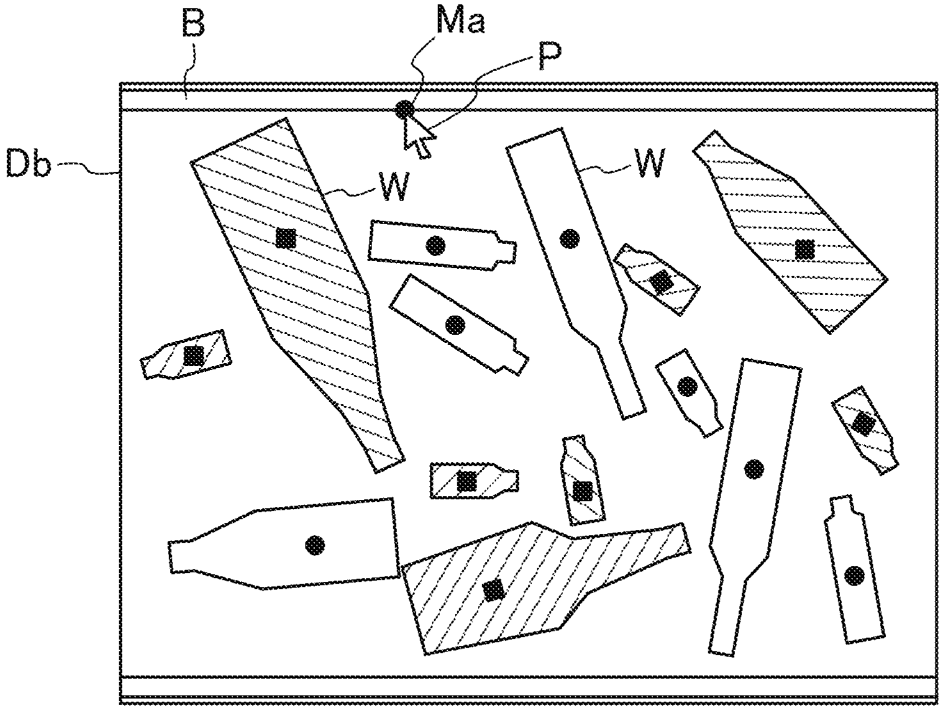
FIG. 16 illustrates an example of the second image in the display.

A case where the second image Db selected in step S2 is an image illustrated in FIG. 16 will be described. The second image Db in FIG. 16 is an image in which a mark Ma is detected to be assigned at a position where no objects W are present through the detection process by the detector 145.

In this example, the mark Ma is assigned to the wall of the bucket B. In this case, the user specifies the mark Ma with the pointer P and pushes a delete button 134 in the display 13. Accordingly, the mark Ma is deleted from the second image Db, and step S3 is finished. In this case, for detected objects W (i.e., detection successful objects W), marks M (i.e., detection result) assigned to these objects W are utilized to omit a label assignment process.

When step S3 is finished in the manner described above, the process proceeds to step S4. In step S4, training data is generated. That is, the generator 143 generates a group of the second image Db and labels assigned to detection failed objects W and a detection result of detection successful objects W, as training data. In generating training data based on the second image Db, the time necessary for a label assignment process to the second image Db is shorted as described above, and thus, the time necessary for generating training data is shortened. In next step S5, the generator 143 stores the generated training data in the storage 12. In this manner, the second generation process is finished. The process from step S1 through step S5 is performed for each second image Db in the thumbnail list 131.

As described above, the controller 1 generates training data for retraining a trained detection model that detects an object W included in an image and predetermined information of the object W. The controller 1 (training data generator) includes: the label assigner 142 that assigns a label indicating predetermined information to an object W included in an image in response to input operation of a user; the generator 143 that generates a group of the image and a label assigned to the image as training data; and the storage 12 that stores a second image Db on which detection by a detection model was performed and failed for at least one object W, in association with a detection result by the detection model. In the second image Db in the storage 12, the label assigner 142 assigns the label indicating the predetermined information to a detection failed object W in response to input operation of the user, and substitutes the label indicating the predetermined information of a detection successful object W by the detection result by the detection model. The generator 143 generates a group of the second image Db in the storage 12 and the label assigned to the detection failed object W and the detection result of the detection successful object W as training data.

The generation program PG (training data generation program) causes a computer to perform the function of generating training data for retraining a trained detection model that detects an object W included in an image and predetermined information of the object W. The generation program PG causes the computer to perform the functions of: assigning a label indicating the predetermined information to the object W included in the image in response to input operation of a user; generating a group of the image and the label assigned to the image as training data; storing a second image Db on which detection by the detection model was performed and failed for at least one object W, in association with a detection result by the detection model; assigning the label indicating the predetermined information of a detection failed object W to a detection failed objects W in response to input operation of the user and substituting the label indicating the predetermined information of a detection successful object W by the detection result by the detection model, in the second image Db; and generating a group of the second image Db, and the label assigned to the detection failed object W and the detection result of the detection successful object W, as training data.

With these configurations, the predetermined information of the detection successful object W is detected appropriately. Thus, the detection result of the detection successful object is utilized to substitute the label assignment process. That is, the label assignment process on the second image Db is performed not on all the objects W but on only detection failed objects W. Accordingly, the label assignment process on the detection successful object W is omitted, and thus, the label assignment process on the second image Db is eased. Consequently, the time necessary for the label assignment process on the second image Db can be shortened. The generator 143 generates a group of the second image Db, and the label assigned to the detection failed object W and the detection result of the detection successful object W, as training data. In this manner, in generating training data based on the second image Db, the time necessary for the label assignment process on the second image Db is shortened. As a result, the time necessary for generating training data for retraining a trained detection model can be shortened.

The controller 1 further includes the display 13 that displays the second image Db. The label assigner 142 assigns a mark indicating the predetermined information to the detection failed object W included in the second image Db displayed by the display 13 in response to input operation of the user to thereby assign the label.

With this configuration, the label is assigned by assigning the mark M to the object W in the second image Db displayed by the display 13 so that a label assignment process can be thereby performed with visual recognition. When the shape and/or the color of the mark M is changed, the label can be easily recognized depending on the object W. Accordingly, the label assignment process is more easily performed.

The controller 1 further includes the display controller 141 that causes the display 13 to display the second image Db in the storage 12. In causing the display 13 to display the second image Db in the storage 12, the display controller 141 assigns the mark indicating the detection result to the detection successful object W included in the second image Db in the storage 12.

With this configuration, the mark M indicating the detection result is assigned to the detection successful object W in the second image Ds, and thus, the detection result can be more easily used. Accordingly, the label assignment process can be easily substituted by the detection result, and the label assignment process can be easily omitted.

In the controller 1, the predetermined information of the object W is positional information of the object W. The label assigner 142 assigns label by using a position of mark M assigned to an object W in response to input operation of the user as positional information of the object.

With this configuration, the mark M assigned to a displayed object W is assigned to thereby assign the label indicating positional information of the object W, and thus, the label assignment process can be easily performed.

The position of the mark M is set as a position at which the robot arm 42 performs a predetermined process on the object W based on the position of the mark M.

With this configuration, the position concerning the process by the robot arm 42 can be easily obtained from the position of the mark M. Accordingly, process operation of the robot arm 42 on the object W is easily controlled.

The position of the mark M is set as a position at which the robot arm 42 holds the object W.

With this configuration, the position of holding by the robot arm 42 can be easily obtained from the position of the mark M. Accordingly, holding operation of the robot arm 42 on the object W is easily controlled.

In the controller 1, the predetermined information of the object W is attribute information of the object W. The label assigner 142 assigns the mark M of a color distinguished based on attribute information of the object W to the object W to thereby assign the attribute information of the object W.

With this configuration, the color of the mark M is distinguished depending on the attribute information of the object W, and thus, visual recognizability to attribute information of each object W is enhanced. Accordingly, easiness in the label assignment process is enhanced.

In the controller 1, the detection failed object W is an undetected object W or a misdetected object W.

With this configuration, since undetection and misdetection are typical examples of detection failures, the label assignment process on the second image Db can be effectively eased.

Other Embodiments

In the foregoing section, the embodiment has been described as an example of the technique disclosed in the present application. The technique disclosed here, however, is not limited to this embodiment, and is applicable to other embodiments obtained by changes, replacements, additions, and/or omissions as necessary. Components described in the above embodiment may be combined as a new exemplary embodiment. Components provided in the accompanying drawings and the detailed description can include components unnecessary for solving problems as well as components necessary for solving problems in order to exemplify the technique. Therefore, it should not be concluded that such unnecessary components are necessary only because these unnecessary components are included in the accompanying drawings or the detailed description.

For example, although the colors of marks M are changed depending on attributes of objects W in the above embodiment, shapes of the marks M may be changed instead of colors.

The detection failed objects W may be only undetected objects W or may be only misdetected objects W.

The predetermined information of objects W may be any one of positional information and attribute information of the objects W. The attribute information of the objects W is not limited to colors of the objects W and may be shapes or sizes of the objects W.

The controller 1 (i.e., training data generator) according to the above embodiment includes not only the function of generating training data but also the training function by the learner 144 and the detection function by the detector 145. However, the technique disclosed here is not limited to this example, and at least one of the learner 144 or the detector 145 may be used alone. That is, the training data generator may be a device including none of the learner 144 and the detector 145, or may be a device omitting the learner 144 or the detector 145.

The controller 1 may be a device in which the first generation process is omitted in the generation process of training data, that is, a device that performs only the second generation process. That is, the controller 1 may be a device on which an externally purchased trained detection model is mounted.

The predetermined process performed by the robot arm 42 on objects W may not holding of the objects W and may be coating, welding, screwing, and other processes to the objects W.

Functions of elements disclosed herein may be performed by using a circuit or a processing circuit including a general-purpose processor, a dedicated processor, an integrated circuit, an application specific integrated circuit (ASIC) configured or programmed to perform disclosed functions, a conventional circuit, and/or a combination thereof. A processor includes a transistor and other circuits, and thus, are assumed to be a processing circuit or a circuit. In the present disclosure, a circuit, a unit, or a means is hardware that performs listed functions, or hardware programmed to perform listed functions. The hardware may be the hardware disclosed herein, or known hardware programmed or configured to perform listed functions. If the hardware is a processor considered as a type of a circuit, the circuit, the means, or the unit is a combination of hardware and software, and software is used for a configuration of hardware and/or a processor.

The techniques of the present disclosure described above are summarized as follows.

[1] A controller 1 (training data generator) generates training data for retraining a trained detection model that detects an object W included in an image and predetermined information of the object W. The controller 1 includes: the label assigner 142 that assigns a label indicating the predetermined information to the object W included in the image in response to input operation of a user; the generator 143 that generates a group of the image and the label assigned to the image as training data; and the storage 12 that stores a second image Db (image) on which detection by the detection model was performed and failed for at least one object W, in association with a detection result by the detection model, in the second image Db in the storage 12, the label assigner 142 assigns the label indicating the predetermined information to a detection failed object W in response to input operation of the user and substitutes the label indicating the predetermined information of a detection successful objects W by the detection result, and the generator 143 generates a group of the second image Db in the storage 12, and the label assigned to the detection failed object W and the detection result of the detection successful object W, as training data.

With this configuration, the predetermined information of the detection successful object W is detected appropriately. Thus, the detection result of the detection successful object is utilized to substitute the label assignment process. Accordingly, the label assignment process on the detection successful object W is omitted, and thus, the label assignment process on the second image Db is eased. Consequently, the time necessary for the label assignment process on the second image Db can be shortened. As a result, the time necessary for generating training data for retraining the trained detection model can be shortened.

[2] The controller 1 of [1] further includes the display 13 that displays the second image Db in the storage 12, and the label assigner 142 assigns a mark M indicating the predetermined information to the detection failed object W included in the second image Db in the storage 12 displayed by the display 13 in response to input operation of the user to thereby assign the label.

With this configuration, the label is assigned by assigning the mark M to the object W in the second image Db displayed by the display 13 so that a label assignment process can be thereby performed with visual recognition. When the shape and/or the color of the mark M is changed, the label can be easily recognized depending on the object W. Accordingly, the label assignment process is more easily performed.

[3] The controller 1 of [1] or [2] further includes the display controller 141 that causes the display 13 to display the second image Db in the storage 12, and in causing the display 13 to display the second image Db in the storage 12, the display controller 141 assigns the mark indicating the detection result to the detection successful object W included in the second image Db in the storage 12.

With this configuration, the mark M indicating the detection result is assigned to the detection successful object W in the second image Ds, and thus, the detection result can be more easily used. Accordingly, the label assignment process can be easily substituted by the detection result, and the label assignment process can be easily omitted.

[4] In the controller 1 of any one of [1] to [3], the predetermined information is positional information of the object W in the second image Db in the storage 12, and the label assigner 142 assigns the label by using a position of the mark assigned to an object W in response to input operation of the user as positional information of the object W.

With this configuration, the mark M assigned to a displayed object W is assigned to thereby assign the label indicating positional information of the object W. Accordingly, the label assignment process is easily performed.

[5] In the controller 1 of any one of [1] to [4], the position of the mark is set as a position at which the robot arm 42 performs a predetermined process on the object W based on the position of the mark.

With this configuration, the position concerning the process by the robot arm 42 can be easily obtained from the position of the mark M. Accordingly, process operation of the robot arm 42 on the object W is easily controlled.

[6] In the controller 1 of any one of [11] to [5], the position of the mark is set as a position at which the robot arm 42 holds the object W.

With this configuration, the position of holding by the robot arm 42 can be easily obtained from the position of the mark M. Accordingly, holding operation of the robot arm 42 on the object W is easily controlled.

[7] The controller 1 of any one of [1] to [6] is communicable with the robot controller 3 that controls the robot arm 42.

With this configuration, the robot controller 3 can cause the robot arm 42 to perform a predetermined process on the object W based on the position of the mark M output from the controller 1.

[8] In the controller 1 of any one of [1] to [7], the predetermined information is attribute information of an object W, and the mark of a color distinguished based on attribute information of the object W is assigned to the object W in response to input operation of the user so that the label assigner 142 assigns the label by using the color of the mark as attribute information of the object W.

With this configuration, the color of the mark M is distinguished depending on the attribute information of the object W, and thus, visual recognizability to attribute information of each object W is enhanced. Accordingly, easiness in the label assignment process is enhanced.

[9] In the controller 1 of any one of [1] to [8], the detection failed object W is an undetected object W or a misdetected object W.

With this configuration, since undetection and misdetection are typical examples of detection failures, the label assignment process on the second image Db can be effectively eased.

The generation program PG (training data generation program) causes a computer to perform the function of generating training data for retraining a trained detection model that detects an object W included in an image and predetermined information of the object W. The generation program PG causes the computer to perform the functions of: assigning a label indicating the predetermined information to the object W included in the image in response to input operation of a user; generating a group of the image and the label assigned to the image as training data; storing a second image Db (image) on which detection by the detection model was performed and failed for at least one object W, in association with a detection result by the detection model; assigning the label indicating the predetermined information to a detection failed object W in response to input operation of the user and substituting the label indicating the predetermined information of a detection successful object W by the detection result, in the stored image; and generating a group of the stored image, and the label assigned to the detection failed object W and the detection result of the detection successful object W, as training data.

With this configuration, in a manner similar to the controller 1 of [1], the time necessary for generating training data for retraining the trained detection model can be shortened.

The invention claimed is:

1. A training data generator that generates training data for retraining a trained detection model, the training data generator comprising:

a processor programmed to:

detect an object included in an image;

a label to the object included in the image in response to input operation of a user, the label indicating (i) positional information identifying a position of the object within the image, and (ii) attribute information relating to a detection result of the object by the trained detection model; and generate a group of the image and the label assigned to the image as training data; and a storage that stores an image on which detection by the detection model was performed and failed for at least one object, in association with a detection result by the detection model, wherein in the stored image, the processor is programmed to assign the label to a detection failed object in response to input operation of the user and substitutes the label of a detection successful object by the detection result, and the processor is programmed to generate retraining data using the stored image and the positional information included in the label assigned to the detection failed object and such that the retraining data is configured to retrain the trained detection model using the positional information as object position information for detecting the object.

2. The training data generator according to claim 1, further comprising a display that displays the image in the storage, wherein the processor is programmed to assign a mark indicating the positional information and the attribute information to the detection failed object included in the image in the storage displayed by the display in response to input operation of the user to thereby assign the label.

3. The training data generator according to claim 2, wherein the processor is programmed to:

cause the display to display the image in the storage, and in causing the display to display the image in the storage, assign the mark indicating the detection result to the detection successful object included in the image in the storage.

4. The training data generator according to claim 2, wherein the processor is programmed to assign the label by using a position of the mark assigned to an object in response to input operation of the user as positional information of the object.

5. The training data generator according to claim 4, wherein the position of the mark is set as a position at which a robot arm performs a predetermined process on the object based on the position of the mark.

6. The training data generator according to claim 5, wherein the position of the mark is set as a position at which the robot arm holds the object.

7. The training data generator according to claim 5, wherein the processor is communicable with a robot controller that controls the robot arm.

8. The training data generator according to claim 2, wherein the mark of a color distinguished based on attribute information of the object is assigned to the object in response to input operation of the user; and the processor is programmed to assign the label by using the color of the mark as attribute information of the object.

9. The training data generator according to claim 1, wherein the detection failed object is an undetected object or a misdetected object.

10. A non-transitory storage medium storing a training data generation program that generates training data for retraining a trained detection model, the program causing a computer to perform the functions of:

detecting an object included in an image;

assigning a label to the object included in the image in response to input operation of a user, the label indicating (i) positional information identifying a position of the object within the image, and (ii) attribute information relating to a detection result of the object by the trained detection model; and generating a group of the image and the label assigned to the image as training data;

storing an image on which detection by the detection model was performed and failed for at least one object, in association with a detection result by the detection model;

assigning the label to a detection failed object in response to input operation of the user and substituting the label of a detection successful object by the detection result, in the stored image; and generating retraining data using the stored image and the positional information included in the label assigned to the detection failed object and such that the retraining data is configured to retrain the trained detection model using the positional information as object position information for detecting the object.

11. A training data generation method for generating training data for retraining a trained detection model, the method comprising:

detecting an object included in an image;

assigning a label to the object included in the image in response to input operation of a user, the label indicating (i) positional information identifying a position of the object within the image, and (ii) attribute information relating to a detection result of the object by the trained detection model; and generating a group of the image and the label assigned to the image as training data;

storing an image on which detection by the detection model was performed and failed for at least one object, in association with a detection result by the detection model;

assigning the label to a detection failed object in response to input operation of the user and substituting the label of a detection successful object by the detection result, in the stored image; and generating retraining data using the stored image and the positional information included in the label assigned to the detection failed object and such that the retraining data is configured to retrain the trained detection model using the positional information as object position information for detecting the object.

* * * * *